(12) United States Patent
Yoon et al.

(10) Patent No.: US 6,229,941 B1
(45) Date of Patent: May 8, 2001

(54) APPARATUS AND METHOD OF FABRICATING LONG-PERIOD FIBER GRATING

(75) Inventors: Shin-young Yoon, Suwon; Se-yoon Kim, Anyang; Kyung-ho Kwack, Suwon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/413,797

(22) Filed: Oct. 7, 1999

(30) Foreign Application Priority Data

Oct. 7, 1998 (KR) .................................................. 98-41861

(51) Int. Cl.[7] ...................................................... G02B 6/34
(52) U.S. Cl. ............................................. 385/37; 359/566
(58) Field of Search ............................... 385/37; 359/130, 359/566

(56) References Cited

U.S. PATENT DOCUMENTS 5,951,881 * 9/1999 Rogers et al. .......................... 216/41
6,038,358 * 9/1999 Nishiki .................................. 385/37

* cited by examiner

*Primary Examiner*—Darren Schuberg
*Assistant Examiner*—Fayez Assaf
(74) *Attorney, Agent, or Firm*—Robert E. Bushnell, Esq.

(57) ABSTRACT

An apparatus and method of fabricating long-period fiber grating is provided. The apparatus includes a fiber, a string, one end of which is fixed, that is located over the fiber and vibrates at a predetermined vibration frequency, a vibrating portion, which vibrates the string at the vibration frequency, to which the other end of the string is connected, and a laser source for illuminating a laser on the string and the fiber, wherein the laser is periodically transmitted by the fiber due to the vibration of the string, and thus the refractive index of the fiber is changed. The long-period fiber grating is easily formed by locating the string, which vibrates at a predetermined vibration frequency, over the fiber and illuminating a laser to the resultant structure.

21 Claims, 4 Drawing Sheets

US 6,229,941 B1

APPARATUS AND METHOD OF FABRICATING LONG-PERIOD FIBER GRATING

CLAIM OF PRIORITY

This application makes reference to, incorporates the same herein, and claims all benefits accruing under 35 U.S.C. §119 from my application APPARATUS AND METHOD OF FABRICATING LONG-PERIOD FIBER GRATING filed with the Korean Industrial Property Office on Oct. 7, 1998 and there duly assigned Serial No. 41861/1998.

BACKGROUND OF THE INVENTION

1. Field of the Invention

The present invention relates to an apparatus and method of fabricating a long-period fiber grating and more particularly, to an apparatus for fabricating a long-period fiber grating using a string which vibrates with a predetermined period.

2. Description of the Related Art

Typical long-period fiber gratings are elements for coupling a core mode, in which light travels through the core of an optical fiber, to a cladding mode, and thus are well suited to gain-flattening of an erbium doped fiber amplifier (EDFA) since they do not act as a reflective type device.

Long-period fiber gratings can be fabricated by a methods of using an amplitude mask on which a light transmission/non-transmission portion has a predetermined period; by vibrating an optical fiber at a predetermined period; or by a method of applying stress to the optical fiber at a predetermined period.

In the method of using an amplitude mask, the refractive index of the core of an optical fiber, which is sensitive to ultraviolet rays, is periodically varied using an amplitude mask having a predetermined period. That is, to obtain an arbitrary coupling peak wavelength $\lambda$, the refractive index difference between the core and cladding of an optical fiber is formed by directly projecting an ultraviolet laser onto an amplitude-modulated mask having a grating cycle $\Lambda$, thereby fabricating a long-period fiber grating. Here, the coupling peak wavelength value $\lambda$ is determined by the following Equation 1:

$$\lambda = (n_{core} - n_{cladding})\Lambda \quad (1)$$

wherein $n_{core}$ is the refractive index of the core, $n_{cladding}$ is the refractive index of the cladding, and $\Lambda$ is the period of an amplitude mask.

A conventional apparatus for fabricating a long-period fiber grating using an amplitude mask includes an amplitude mask mounted on a fiber, and a laser source for irradiating laser light onto the amplitude mask. However, in the method of using an amplitude mask, the period of the amplitude mask is determined according to the intended coupling peak wavelength to be obtained. Therefore, the ultraviolet laser may be collimated with various methods or a dual mask may be applied when the period of the amplitude mask is changed.

The long-period fiber grating can also be fabricated by vibrating an optical fiber or by applying stress using comb-shaped probes. However, these alternative methods have problems in that stability and reproducibility are difficult, and the devices required to fabricate the long-period fiber grating are large.

SUMMARY OF THE INVENTION

It is therefore an object of the present invention to provide an improved method of fabricating a long-period fiber grating.

It is also an object of the present invention to provide an improved apparatus for fabricating a long-period fiber grating.

It is a further object of the invention to provide a method of fabricating a long-period fiber grating with excellent stability and reproducibility.

It is a yet further object of the present invention to provide a method of fabricating a long-period fiber grating in which no collimation of the laser is required when changing the period of the fiber.

It is a still further object of the present invention not to require a dual mask.

To achieve the above objectives of the present invention, the present invention provides an apparatus and method of fabricating a long-period fiber grating by locating a string which vibrates at a predetermined cycle over a fiber and illuminating an ultraviolet laser on the string and the fiber.

Accordingly, to achieve the above objective, the present invention provides a long-period fiber grating fabrication apparatus including: a fiber; a string, one end of which is fixed, that is located over the fiber and vibrates at a predetermined vibration frequency; a vibrating portion, which vibrates the string at the vibration frequency, to which the other end of the string is connected; and a laser source for illuminating laser light on the string and the fiber, wherein the laser light is periodically transmitted by the fiber due to the vibration of the string, and thus the refractive index of the fiber is changed.

To achieve the above objectives, the present invention also provides a long-period fiber grating fabrication apparatus including: a fiber; a string, one end of which is fixed, that is located over the fiber and vibrates at a predetermined vibration frequency; a vibrating portion, which vibrates the string at the vibration frequency, to which the other end of the string is connected; a period controller connected to the vibrating portion for controlling the period of the string by moving the vibrating portion upward and downward; and a laser source for illuminating laser light onto the string, wherein the laser light is periodically transmitted by the fiber due to the period-controlled vibration of the string, and thus the refractive index of the fiber is changed.

To achieve the above objectives, the present invention provides a long-period fiber grating fabrication method including the steps of: aligning a string over a fiber in the longitudinal direction of the fiber; forming a standing wave by vibrating the string at a predetermined vibration frequency; and illuminating laser light to the vibrating string and the fiber, wherein the laser light is periodically transmitted by the fiber due to the vibration of the string, and thus the refractive index of the fiber is periodically changed.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
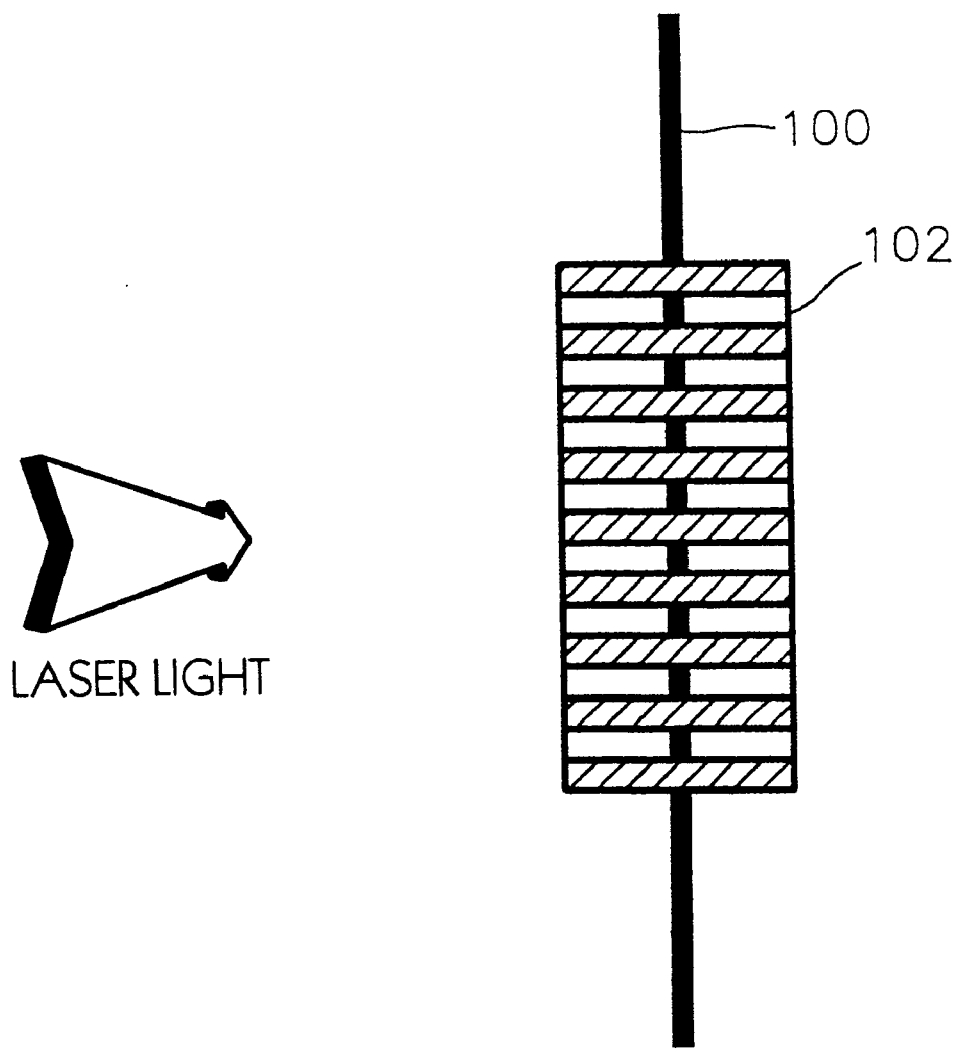
FIG. 1 is an outline view of a conventional apparatus for fabricating a long-period fiber grating using an amplitude mask.

Turning now to the drawings, FIG. 1 is an outline view of the conventional apparatus for fabricating a long-period fiber grating using an amplitude mask described above. The apparatus of FIG. 1 includes an amplitude mask 102 mounted on a fiber 100, and a laser source (not shown) for irradiating laser light onto the amplitude mask 102.

Figure 2:
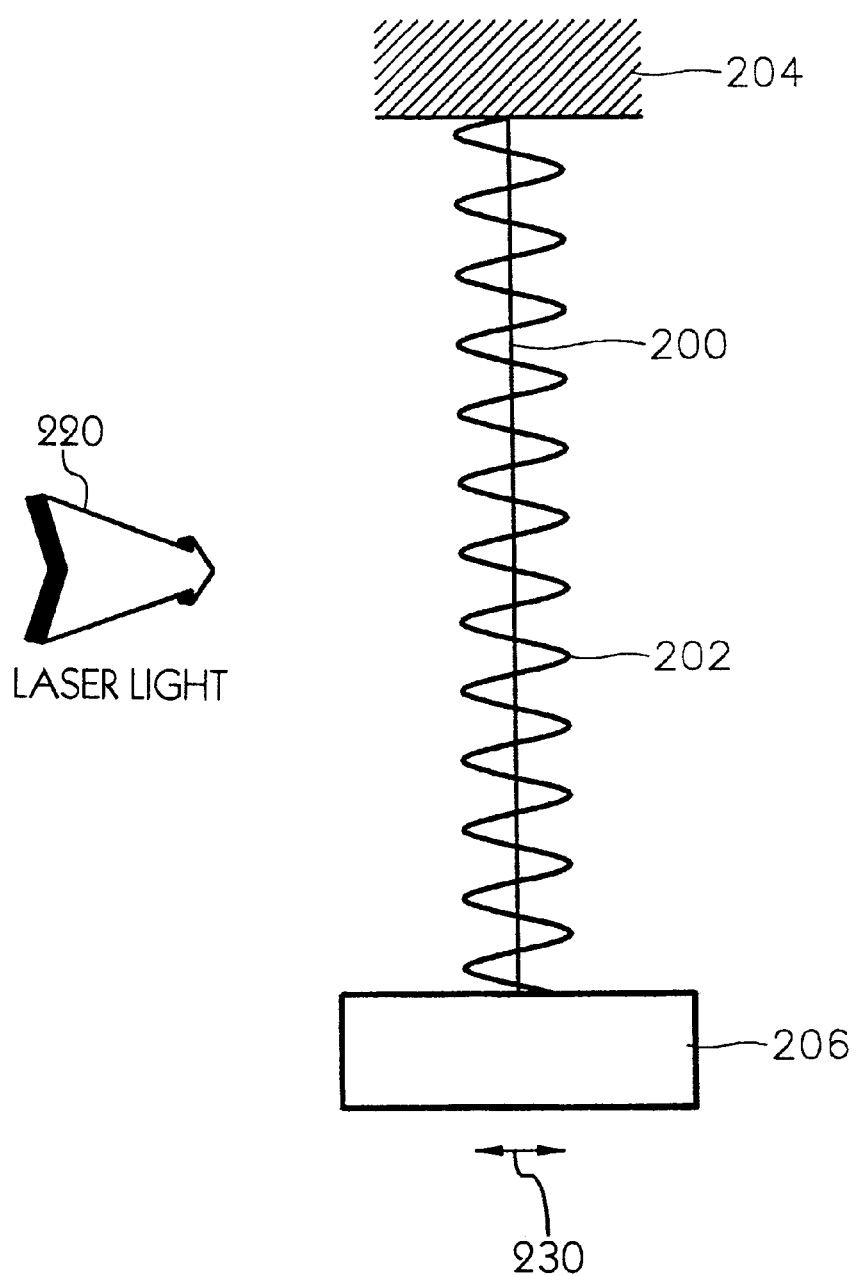
FIG. 2 is an outline view of an apparatus for fabricating a long-period fiber grating according to the present invention.

The present invention will now be described with reference to the drawings. Referring to FIG. 2, an apparatus for fabricating a long-period fiber grating according to the present invention includes a fiber 200, a string 202 which is oriented in the same direction as the direction of the fiber 200 and vibrates at a predetermined vibration frequency, a fixing portion 204 to which one end of to the string 202 is fixed, a vibrating portion 206 to which the other end of the string 202 is connected, and a laser source (not shown) for illuminating laser light 220 on the string 202.

The string 202 is located over and along the fiber 200. The thickness of the string 202 is determined according to the characteristics of long-period fiber grating intended to be fabricated. The thickness of the string depends on the desired period of the long-period fiber grating, and for example, may be in the range of approximately several micrometers to tens of micrometers. The string 202 is formed of a material which can vibrate at a desired vibration frequency and which can prevent UV light from being transmitted to the optical fiber. Preferably, the string should be formed of a material which can provide a mechanical vibration in a horizontal or vertical direction by pulling the string in the longitudinal direction of the string. The string may, for example, be made of steel, or the string may be made of materials capable of keeping out the ultraviolet light.

The string 202, one end of which is fixed to the fixing portion 204 and the other end of which is connected to the vibration portion 206, vibrates at a predetermined vibration frequency due to the horizontal movement (arrow 230) of the vibrating portion 206, and then forms a standing wave. Vibrating portion 206 may contain a piezoelectric component for vibrating the string. Ultraviolet (UV) laser light 220 is projected onto the string 202 below or, more generally, behind which the fiber 200 is located. Here, the fiber 200 is sensitive to the UV light.

Figures 3A, 3B:
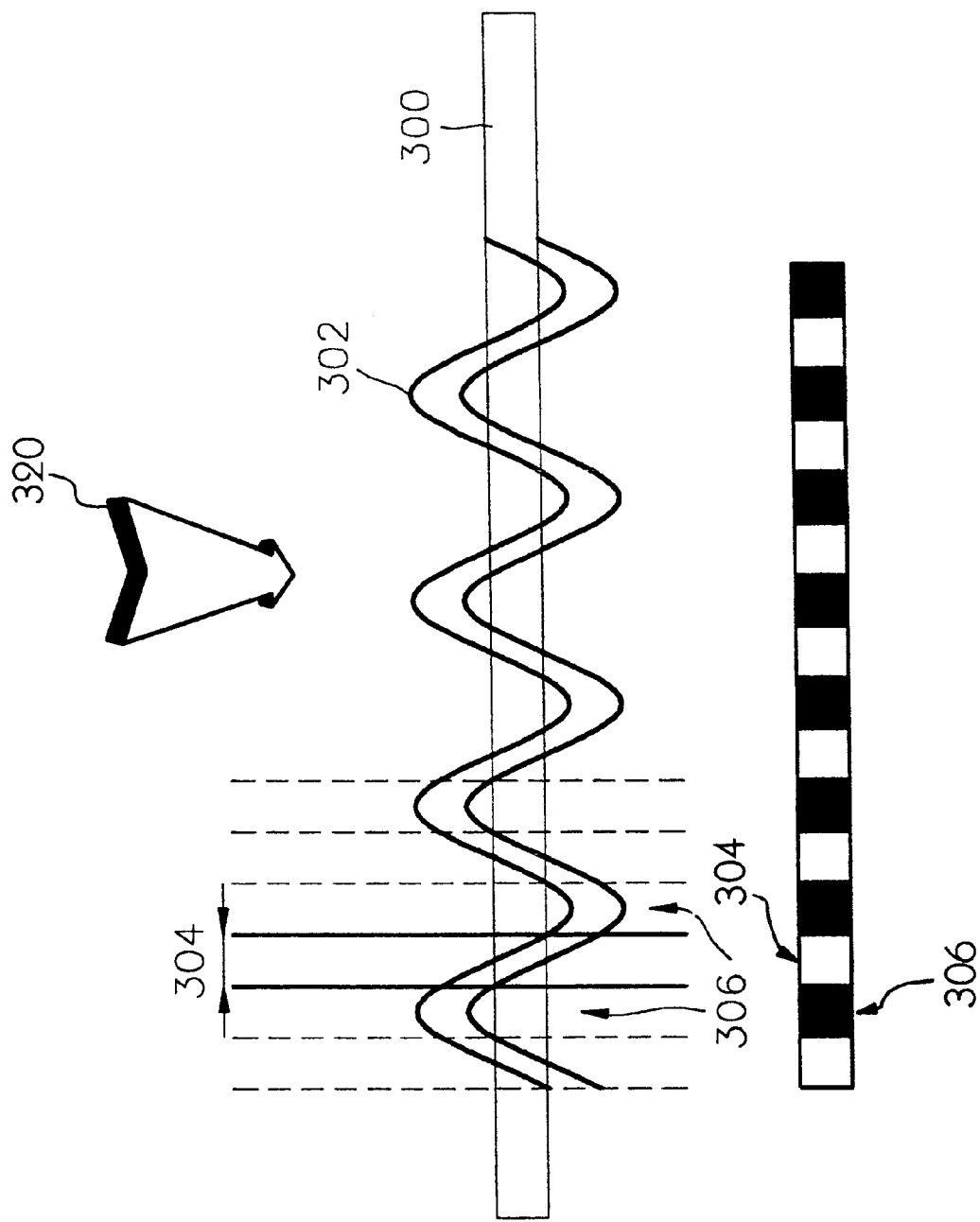
FIG. 3A illustrates a process for fabricating a long-period fiber grating by illuminating ultraviolet rays on a fiber and a string which vibrates at a predetermined cycle.
FIG. 3B shows a long-period fiber grating formed by the process of FIG. 3A.

FIG. 3A illustrates a process for fabricating a long-period fiber grating by illuminating ultraviolet rays on a fiber and a string which vibrates with a predetermined period. Referring to FIG. 3A, a string 302, which vibrates at a predetermined vibration frequency, is located over a fiber 300, and laser light 320 is projected onto the resultant structure. The laser light does not illuminate node portions 304 where the fiber 300 is overlapped by the string 302. The refractive index of the core of the fiber 300 is periodically changed in portions 306 exposed to the laser. FIG. 3B shows a long-period fiber grating formed by the process of FIG. 3A.

Figure 4:
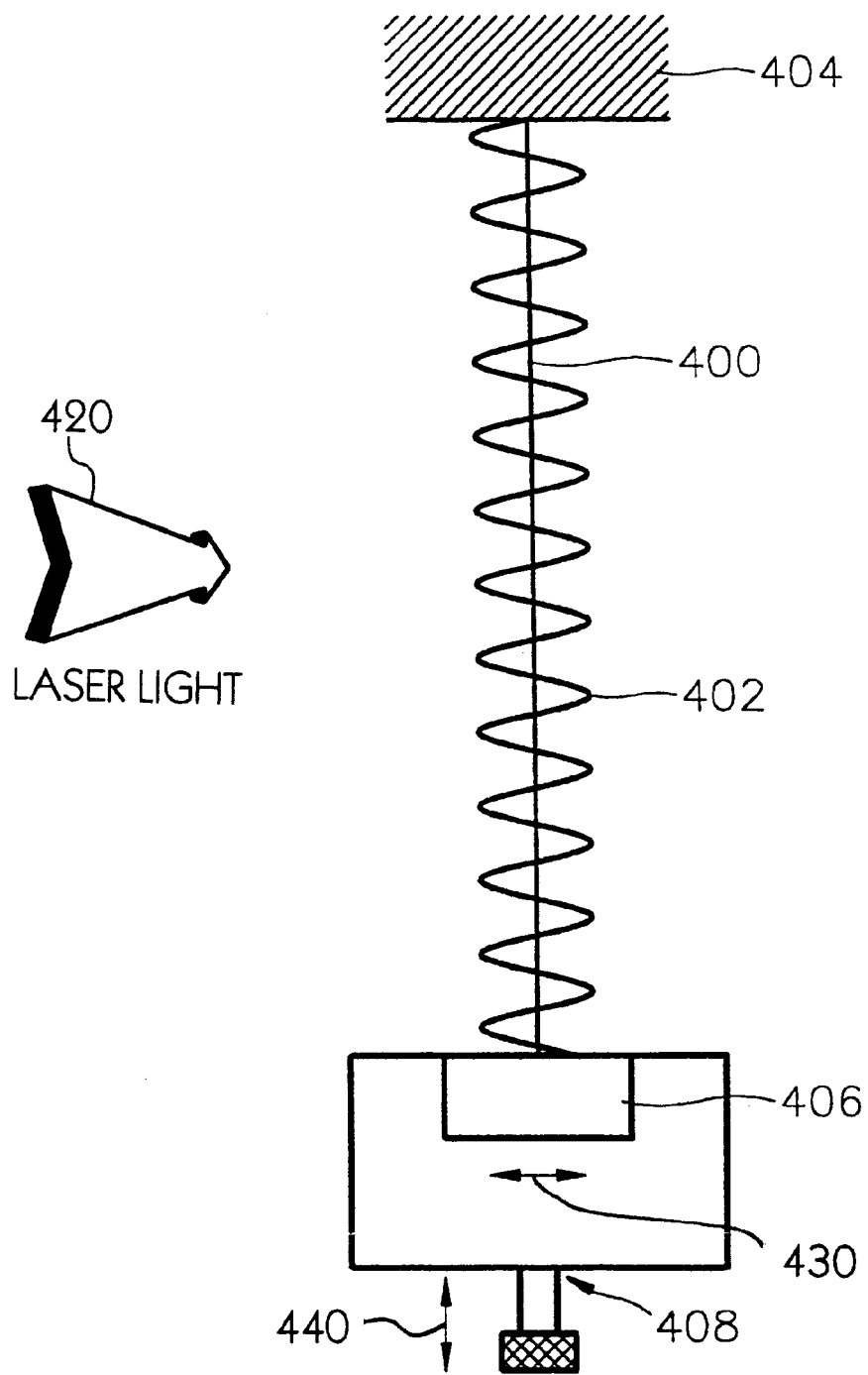
FIG. 4 shows an apparatus in which a period controller is attached to the vibrating portion of the apparatus of FIG. 2.

FIG. 4 shows an apparatus in which a period controller is attached to the vibrating portion of the apparatus of FIG. 2. The apparatus of FIG. 4 includes a fiber 400, a string 402 located over and along the fiber 400, a fixing portion 404 to which one end of the string 402 is fixed, a vibrating portion 406 to which the other end of the string 402 is connected, a period controller 408 for moving the vibrating portion 406 upward and downward (arrow 440), and a laser source (not shown) for illuminating laser light 420 on the string 402. The period controller moves to adjust the string to a particular length which remains fixed while the vibrating portion vibrates (arrow 430).

It is preferable that the period controller 408 is a micromotor. The period of the string 402 is determined by a variation in the vibration frequency of the vibrating portion 406 and the position of the vibrating portion determined by the upward and downward movement made by the period controller 408.

According to the present invention, a long-period fiber grating is easily formed by locating a string which vibrates at a predetermined vibration frequency, over a fiber and illuminating a laser on the resultant structure. Also, the laser is not required to be collnnated, and the period of the long-period grating is easily changed.

What is claimed is:

1. A long-period fiber grating fabrication apparatus comprising:
   a fiber;
   a string, one end of which is fixed, that is located over the fiber and vibrates at a predetermined vibration frequency;
   a vibrating portion, which vibrates the string at the vibration frequency, to which the other end of the string is connected; and
   a laser source for illuminating a laser beam on the string and the fiber,
   wherein the laser beam is periodically transmitted through the fiber due to the vibration node of the string, and thus the refractive index of the fiber is changed.

2. The apparatus of claim 1, wherein the thickness of the string is determined according to the desired characteristics of the long-period fiber grating.

3. The apparatus of claim 1, wherein the string is formed of steel.

4. A long-period fiber grating fabrication apparatus comprising:
   a fiber;
   a string, one end of which is fixed, that is located over the fiber and vibrates at a predetermined vibration frequency;
   a vibrating portion, which vibrates the string at the vibration frequency, to which the other end of the string is connected;
   a period controller connected to the vibrating portion for controlling the period of the string by moving the vibrating portion back and forth; and
   a laser source for illuminating a laser beam onto the string,
   wherein the laser beam is periodically transmitted through the fiber due to the period-controlled vibration of the string, and thus the refractive index of the fiber is changed.

5. The apparatus of claim 4, wherein the period controller is a micromotor.

6. A long-period fiber grating fabrication method comprising the steps of:
   aligning a string over a fiber in the longitudinal direction of the fiber;

forming a standing wave by vibrating the string at a predetermined vibration frequency; and illuminating a laser beam onto the vibrating string and the fiber, wherein the laser beam is periodically transmitted through the fiber due to the vibration of the string, and thus the refractive index of the fiber is periodically changed.

7. An apparatus for fabricating a long-period fiber grating, comprising:

a laser for projecting laser light onto an optical fiber;

a string mounted parallel to the optical fiber between said laser and the optical fiber, for blocking light from the laser to the optical fiber;

a fixing portion attached to one end of said string, for fixing one end of the string; and a vibrating portion attached to the other end of said string, for vibrating the string along a direction perpendicular to the length of the string to form a standing wave in the string.

8. The apparatus of claim 7, said string being formed of a material which can vibrate at a desired frequency.

9. The apparatus of claim 7, said vibrating portion comprising a piezoelectric component for vibrating the string.

10. The apparatus of claim 8, said string being formed of steel.

11. The apparatus of claim 7, said optical fiber being sensitive to ultraviolet light, for forming an optical fiber grating.

12. The apparatus of claim 7, further comprising:

a period controller attached to the vibrating portion, for moving the vibrating portion back and forth in the direction of the length of the string.

13. The apparatus of claim 12, said period controller being a micromotor.

14. A process for fabricating a long-period fiber grating, comprising the steps of:

providing a string oriented parallel to an ultraviolet light-sensitive optical fiber;

vibrating the string to form a standing wave having a period in the string; and projecting ultraviolet light onto the string and optical fiber such that the ultraviolet light is blocked from reaching the optical fiber where the string overlaps the optical fiber.

15. The process of claim 14, said step of vibrating the string further comprising:

fixing one end of the string and vibrating the other end of the string.

16. The process of claim 15, said step of vibrating the other end of the string further comprising:

vibrating the other end along a direction perpendicular to the length of the string.

17. The process of claim 16, said step of vibrating the other end of the string comprising using a vibrating portion attached to the other end of the string.

18. The process of claim 15, further comprising the steps of:

moving the other end of the string back or forth along the direction of the length of the string; and said step of vibrating the other end of the string comprising vibrating the string in a direction perpendicular to the length of the string.

19. The process of claim 18, further comprising the steps of:

using a vibrating portion attached to the other end of the string for vibrating in the direction perpendicular to the length of the string; and using a micromotor attached to the vibrating portion for moving the vibrating portion back or forth along the direction of the length of the string.

20. The method of claim 14, further comprising the step of:

determining the period of the standing wave of the string by adjusting the vibration rate of the string.

21. The method of claim 18, further comprising the step of:

determining the period of the standing wave of the string by adjusting the position to which the other end of the string is moved back or forth, and by adjusting the rate of vibrating the other end of the string.

* * * * *